United States Patent [19]

Krutz, Jr. et al.

[11] Patent Number: 5,537,686

[45] Date of Patent: Jul. 23, 1996

[54] ADVANCED TECHNOLOGY ANTI-G SUIT

[75] Inventors: Robert W. Krutz, Jr., San Antonio; Grady L. Ripley, Houston, both of Tex.; Robert E. Simpson, Fleet, United Kingdom; Ronald C. Hill, San Antonio, Tex.; Thomas W. Travis, San Antonio, Tex.; Thomas R. Morgan, San Antonio, Tex.; John W. Burns, San Antonio, Tex.

[73] Assignee: The United States of America as represented by the Secretary of the Air Force, Washington, D.C.

[21] Appl. No.: 273,440

[22] Filed: Jul. 5, 1994

[51] Int. Cl.⁶ .................................................. B64D 10/00
[52] U.S. Cl. ............................................. 2/2.14; 2/DIG. 3
[58] Field of Search ........................... 2/2.11 A, 2.12, 2/69, 81, 2.14, DIG. 3, 22; 600/20, 19, 2; 128/202.11, 204.26, 204.29, 200.24

[56]  References Cited

U.S. PATENT DOCUMENTS

| 2,762,047 | 9/1956 | Flagg et al. ......................... 2/2 |
| 3,392,405 | 7/1968 | Ritzinger et al. ...................... 2/2.14 |
| 4,039,039 | 8/1977 | Gottfried ............................ 2/DIG. 3 |
| 4,583,522 | 4/1986 | Aronne ............................... 128/1 A |
| 4,674,479 | 6/1987 | Jennings et al. ...................... 128/1 A |
| 4,959,047 | 9/1990 | Tripp, Jr. ............................ 600/19 |
| 5,007,893 | 4/1991 | Row ................................... 600/20 |
| 5,027,437 | 7/1991 | Reddemann et al. ................... 2/81 |
| 5,127,896 | 7/1992 | de Gaston ........................... 2/2.1 A |
| 5,153,938 | 10/1992 | Epperson ............................. 2/2.1 A |
| 5,318,018 | 6/1994 | Puma et al. ........................... 600/19 |

Primary Examiner—C. D. Crowder
Assistant Examiner—Larry D. Worrell, Jr.
Attorney, Agent, or Firm—Fredric L. Sinder; Thomas L. Kundert

[57]  ABSTRACT

A new extended coverage anti-G suit combines a new continuous lower body pressure bladder with a nonextensible outer covering. The continuous lower body pressure bladder includes an abdominal bladder section and a pair of wrap-around leg bladder sections. Each leg bladder sections overlaps slightly at the inseam. A trouser-shaped nonextensible outer covering covers the pressure bladder and restrains its expansion when the pressure bladder is inflated. A pair of pressure socks worn between regular socks and boots interconnects with the pressure bladder.

4 Claims, 5 Drawing Sheets

ADVANCED TECHNOLOGY ANTI-G SUIT

RIGHTS OF THE GOVERNMENT

The invention described herein may be manufactured and used by or for the Government of the United States for all governmental purposes without the payment of any royalty.

BACKGROUND OF THE INVENTION

The present invention relates generally to anti-G suits, and more specifically to anti-G suit improvements increasing the body surface area compressed by the anti-G suit.

While flying simulated or actual combat maneuvers, a fighter pilot's body undergoes very high accelerations from the rapid changes in speed and direction. These accelerations are generally expressed in units of G, the force of gravity felt by a body at the earth's surface. The accelerations of greatest interest to a pilot are those that occur along the vertical $+G_z$ axis of the cockpit when the pilot pulls back hard on the aircraft control stick to accomplish a rapid climb or a fast banked turn. The pilot's oxygen-carrying blood is forced away from its regular path between the heart-lungs and the brain, and pools toward the blood vessels of the lower extremities. The heart and diaphragm tend to move lower, increasing the heart-to-eye column length and further increasing the blood pressure needed to maintain blood flow to the brain. At sufficiently high G's, the pilot's field of view narrows as blood flow to the retinas is reduced, and the pilot may finally lose consciousness from insufficient blood flow to the brain.

Pilots, and other aircrew members, fight the effects of high G's by straining maneuvers, tensing the muscles of their torso and extremities to squeeze shut the blood vessels and force blood flow to continue in the upper part of the body. An anti-G suit helps this process by covering the pilot's legs and torso with air bladders that automatically inflate during acceleration to compress the blood vessels in those regions and force blood flow to continue to the brain. An anti-G suit helps blood flow to continue in the upper part of the body by increasing blood pressure upon inflation, by reducing venus pooling of blood in the lower part of the body and by maintaining heart-to-eye distance.

A typical modern anti-G suit comprises a cutaway pair of trousers with five sewn pockets containing inflatable air bladders. One bladder covers the front of the abdomen, and one each covers the portion of each leg in front of each thigh and each calf. In addition to compressing vascular tissue, the abdominal bladder presses into the abdomen and helps hold the heart in position. The modern anti-G suit, in use virtually unchanged since World War II, evolved from full coverage liquid filled anti-G suits developed in 1939. The water-filled suit performed well, but was abandoned due to poor pilot acceptance. The water-filled suit evolved to an air filled garment in which the size of the bladders were reduced in size until they were accepted by pilots while still providing adequate protection.

Aircraft built between the 1940's and the early 1970's did not have the power to sustain high G turns without losing significant airspeed. The standard anti-G suit provided adequate protection for those aircraft. Modern high-performance jet aircraft, however, can maintain high G maneuvers to such a degree that more protection, particularly duration protection or endurance, was needed. The prior art has attempted a number of ways to increase protection. In particular, the prior art has attempted to increase the body surface area compressed by the anti-G suit without unduly compromising pilot acceptance. An example of those efforts is U.S. Pat. No. 4,674,479 to Jennings et al. which, among other improvements, added a butt strap to a conventional modern anti-G suit arranged so that when the abdominal bladder inflated, it pulled tight the butt strap to compress the aircrew member's highly vascular buttocks.

Unfortunately, despite those and other prior art improvements, there is still a need for anti-G suits that further maximize the duration a pilot or other aircrew member can withstand high G forces while maintaining a configuration that does not interfere with the aircrew members performance in the aircraft. Studies have shown that even with all the prior art improvements to date, there is still too much vascular pooling of blood in the lower extremities.

It is, therefore, a principal object of the present invention to provide an extended coverage anti-G suit that provides increased resistance against vascular pooling without sacrificing pilot acceptance.

It is a feature of the present invention that it applies pressure more uniformly than prior art anti-G suits, significantly increasing comfort for aircrew members.

It is an advantage of the present invention that it is quick and easy to put on or remove.

These and other objects, features and advantages of the present invention will become apparent as the description of certain representative embodiments proceeds.

SUMMARY OF THE INVENTION

The present invention provides an extended coverage, uniform pressure anti-G suit that significantly extends the cumulative time an aircrew member can spend in a high sustained-G environment. The unique discovery of the present invention is a continuous lower body bladder, including an abdominal bladder section and wrap-around leg bladder sections, that finally make possible an extended coverage anti-G suit with maximum anti-G tolerance and with pilot acceptance.

Accordingly, the present invention is directed to an anti-G suit for wear by an aircrew member comprising a continuous pressure bladder having an abdominal bladder section shaped to cover the front abdominal region of the aircrew member and a pair of leg bladder sections individually shaped to each completely wrap around one leg of the aircrew member and to slightly overlap where edges of each leg section meet, and an outer covering having generally the shape of a pair of trousers for covering the pressure bladder wherein the outer covering is made of a nonextensible material so that, upon inflation of the pressure bladder, the outer covering restrains the pressure bladder from extending outward. The anti-G suit may include a pair of sock bladders completely covering the feet and ankles of the aircrew member wherein the sock bladders are pneumatically interconnected with the pressure bladder. The anti-G suit may also include at least one noncollapsable channel from the abdominal bladder section of the pressure bladder to a leg bladder section. The anti-G suit may further include at least one noncollapsable channel across the inside of the abdominal bladder section of the pressure bladder.

DESCRIPTION OF THE DRAWINGS

The present invention will be more clearly understood from a reading of the following detailed description in conjunction with the accompanying drawings wherein.

DETAILED DESCRIPTION

Figure 1:
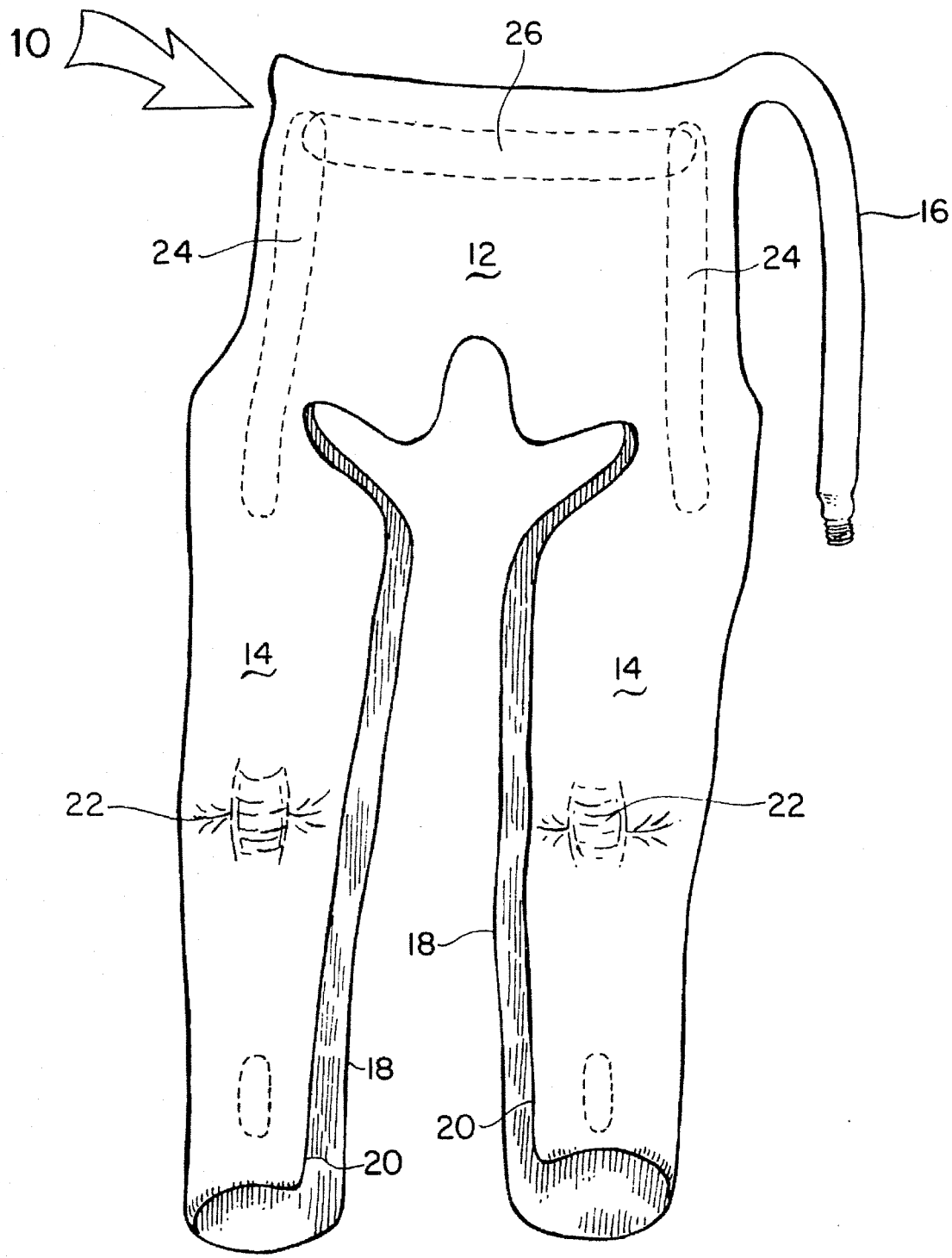
FIG. 1 is a simplified perspective view of an anti-G suit pressure bladder made according to the teachings of the present invention showing the pressure bladder without its outer covering.

Referring now to FIG. 1 of the drawings, there is shown a simplified perspective view of an anti-G suit pressure bladder 10 made according to the teachings of the present invention showing pressure bladder 10 without its outer covering. Pressure bladder 10 is in three primary sections, an abdominal bladder section 12 and two mirror-image wrap-around leg bladder sections 14. An inflation or fill hose 16 is integrated into pressure bladder 10. Fill hose 16 preferably includes a wire coil or coils along its length to prevent kinking or occlusion of the hose. Pressure bladder 10 is made of polyurethane impregnated nylon or other impermeable or pressure containing materials. Pressure bladder 10 is constructed by sealing together precut pieces of bladder material. Sealing techniques may include radio-frequency (rf), ultrasonic, tape and glue, or a combination of these methods.

In use, abdominal bladder section 12 covers the abdominal area of an aircrew member leaving uncovered the buttocks. Each leg bladder section 14 wraps around a leg of an aircrew member so that edges 18 and 20 overlap slightly. Pressure bladder 10 is shaped so that the crotch area is uncovered.

Figure 4:
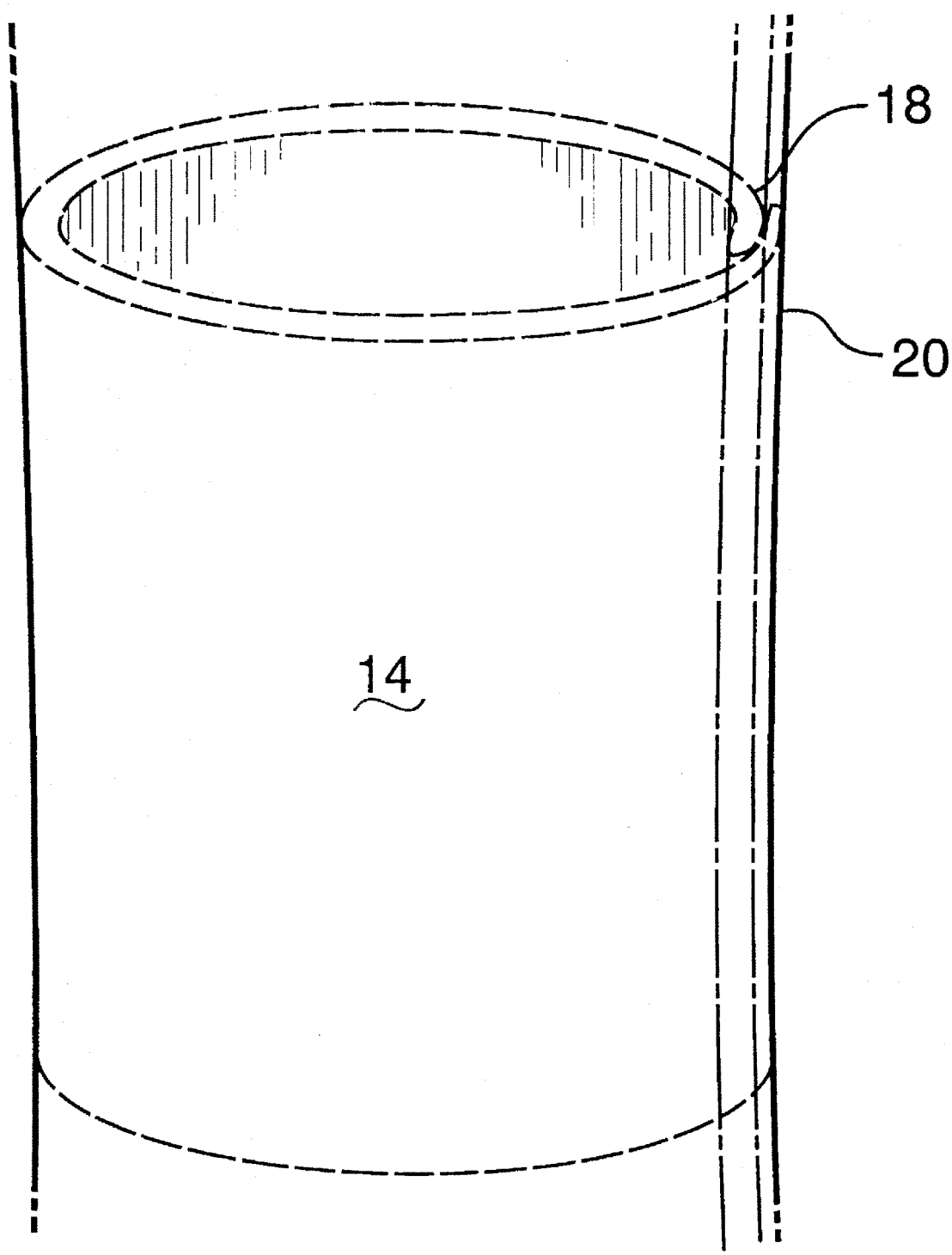

FIG. 4 shows the slightly overlapping edges 18 and 20 when a leg bladder section 14 is wrapped around a leg of an aircrew member.

Pressure bladder 10 includes pouch areas 22 at the knee region of each leg bladder section 14. Pouch areas 22 are made by sealing two vertical seams and one horizontal seam at each knee to pull the bladder material into a pouch-like shape at that point. Pouch areas allow leg bladder sections 14 to bend at the knees.

Pressure bladder 10 also includes a pair of interior channels 24 connecting abdominal bladder section 12 and leg bladder sections 14. Each channel 24 is filled with TRILOCK®, a noncompressible material available from a variety of sources that allows the free flow of air. Channels 24 help preserve the free flow of pressurized air through pressure bladder 10 when an aircrew member is in a sitting position which would otherwise tend to make a constriction at the bend between abdominal bladder section 12 and leg bladder sections 14. A third interior channel 26 filled with TRILOCK® extends across abdominal bladder section 12. Additional noncompressible channels may be provided inside abdominal bladder section 12.

A further refinement to abdominal bladder section 12 is that it is shaped to compress the abdominal area without riding up on the wearer's chest and interfering with breathing. A key element of the sizing, shaping and placement of abdominal bladder section 12 is that its top edge is below the lowest part of the wearer's rib cage so that it will never compress a rib and thus the lungs. This is lower than the height of the abdominal bladder in a standard anti-G suit.

Figure 5:
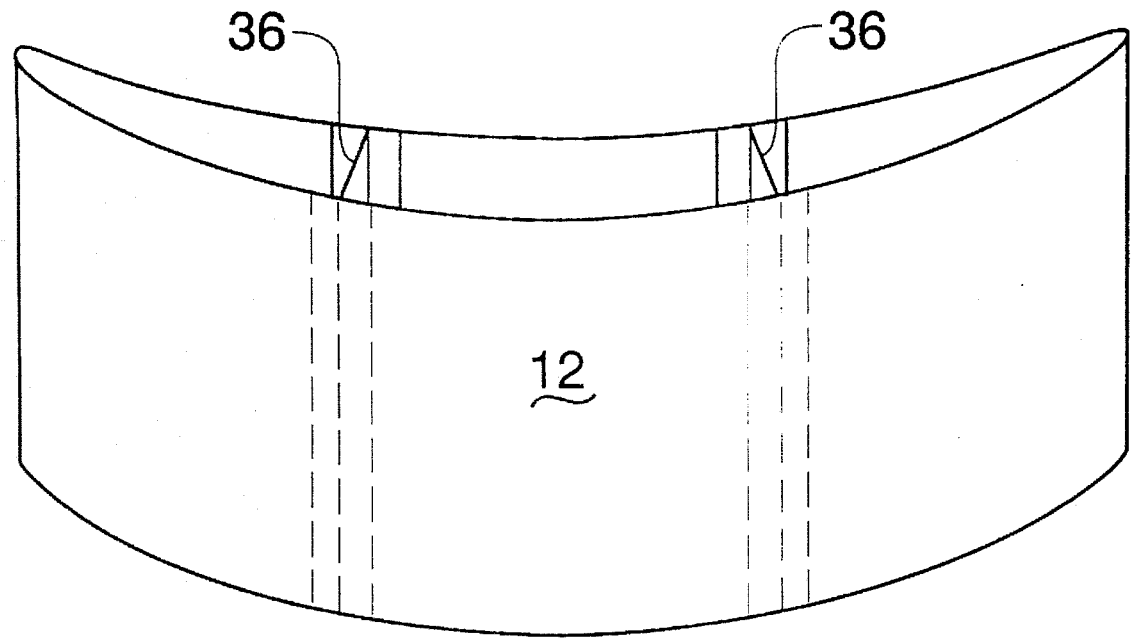
FIG. 5 is a simplified perspective view of a section of the abdominal section of the pressure bladder of FIG. 1 showing internal fabric I-beams; and, FIG. 6 is a simplified top-down view of the section of FIG. 5 showing another view of the internal fabric I-beams.
Figure 6:
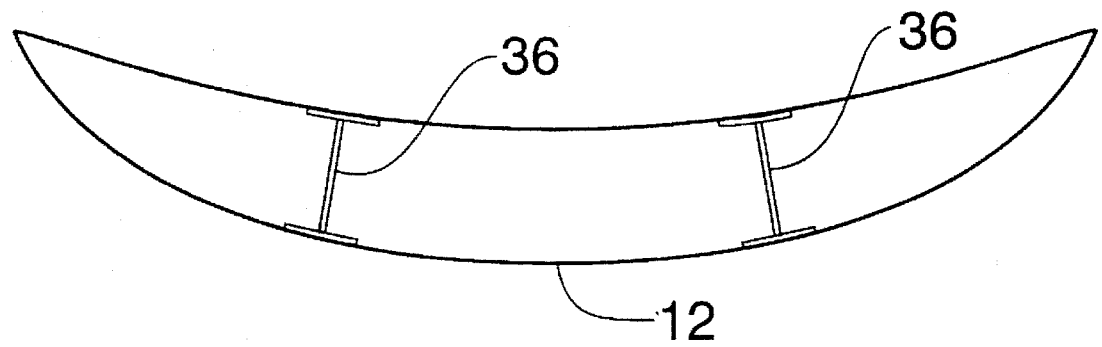

Abdominal bladder section 12 also includes a pair of internal fabric I-beams, shown in FIGS. 5 and 6, which connect the inside of the front of abdominal bladder section 12 with the inside of its back. The internal I-beams prevent abdominal bladder section 12 from inflating in the shape of a football and instead abdominal bladder section 12 inflates in such a way that it applies uniform pressure across the abdomen.

Figure 2:
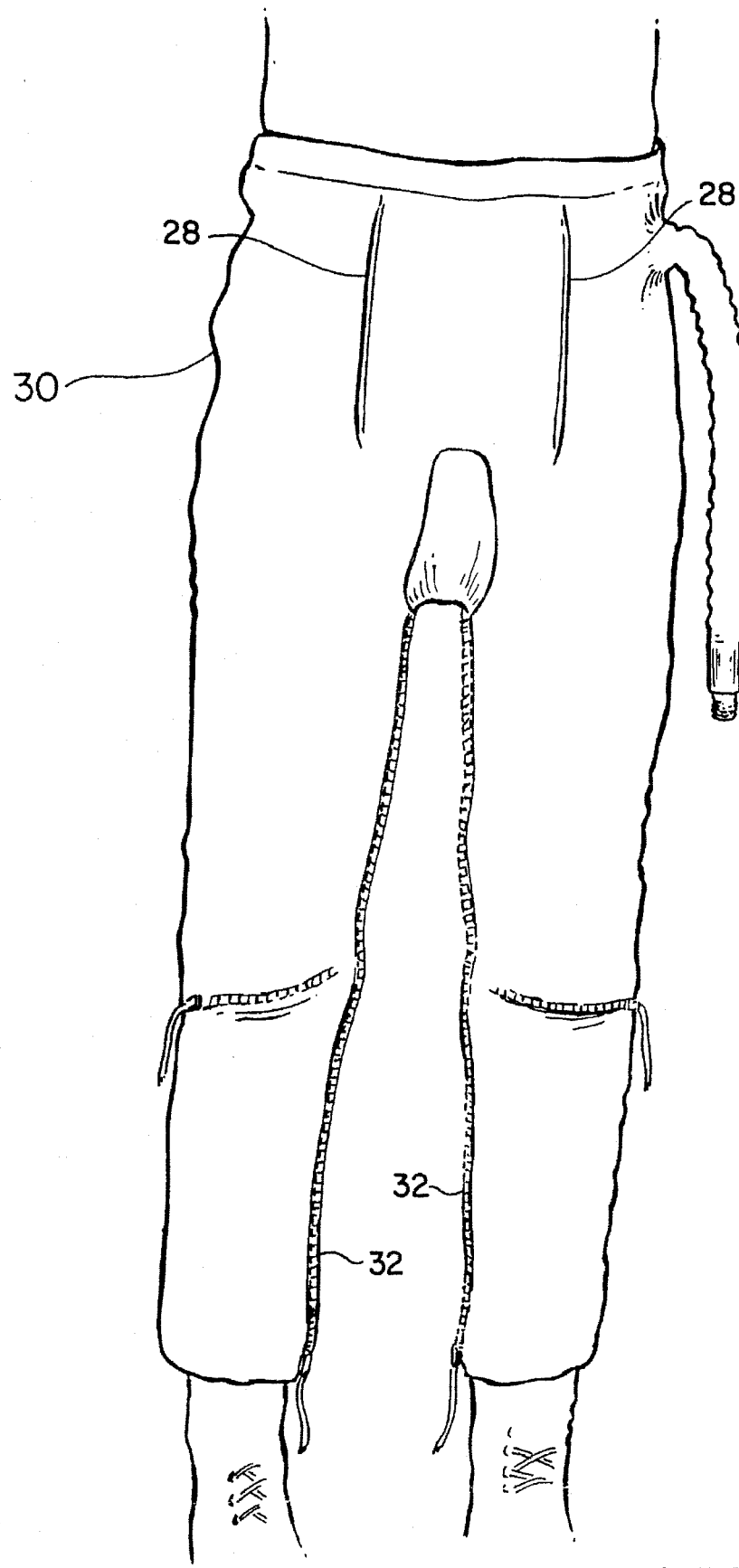
FIG. 2 is a simplified perspective view of an anti-G suit made according to the teachings of the present invention showing its outer covering.

FIG. 2 is a simplified perspective view of an anti-G suit made according to the teachings of the present invention showing its outer covering 30. Outer covering, or restraint layer, 30 is trouser shaped and is made of a NOMEX®-type aromatic polyamide material which limits or restrains outward (from an aircrew member's body) expansion of pressure bladder 10 during pressurization. In use, outer covering 30 is attached at various points to the edges of pressure bladder 10 to form a single unit. Outer covering 30 includes zippers 32 along its inseams to make donning and removing easier. Outer covering 30 also includes a number of lacing panels (not shown) to allow the anti-G suit to be adjusted for a snug fit. A snug fit minimizes the time required for the anti-G suit to develop the needed pressure in response to G forces. Outer covering, or restraint layer, 30 also covers the aircrew member's buttocks to hold the abdominal bladder in place and to provide pressurization of the buttocks when the anti-G suit is inflated. A pair of seams 28 are formed in outer covering 30 over the abdominal bladder section to help hold the bladder in position.

An inner lining covers pressure bladder 10 between it and outer covering 30. The inner lining helps restrain outward bladder expansion during inflation and also helps protect pressure bladder 30 from abrasion and snagging.

An internal lining of a soft, light weight fabric is preferably added to the inside of pressure bladder 10 to separate the pressure bladder from the wearer's body and to protect the bladder from excessive wear and tear.

Figure 3:
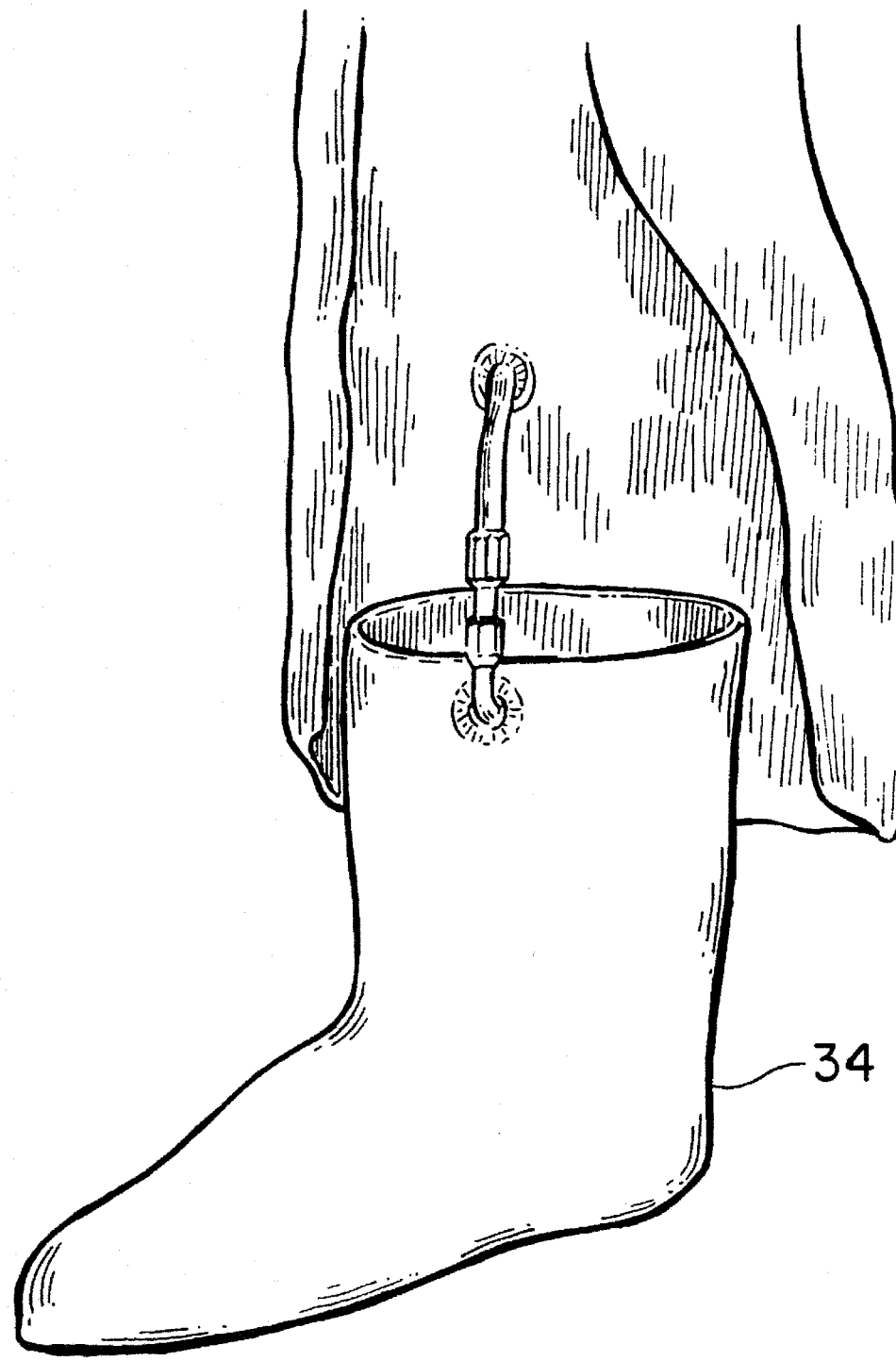
FIG. 3 is a simplified perspective view of a pressure sock made according to the teachings of the present invention; and, FIG. 4 is a simplified perspective view of a section of one leg of the pressure bladder of FIG. 1 in a more wrapped configuration with its edges slightly overlapping.

FIG. 3 is a simplified perspective view of a pressure sock 34 made according to the teachings of the present invention. Pressure sock 34 connects to the inside of pressure bladder 10 through detachable connector 30. Pressure sock 34 is shown turned around in the figure to better show its connection to pressure bladder 10. Pressure sock 34 is worn between the regular socks and boots of an aircrew member.

The disclosed anti-G suit successfully demonstrates the advantages of its unique pressure bladder construction for use in an extended coverage anti-G suit that is accepted by aircrew members. Although the disclosed anti-G suit is specialized, its teachings will find application in other areas where compromises have had to be made in the past for acceptance by users.

The term nonextensible as used in the claims will be understood by those with skill in the art to include any material which is sufficiently nonextensible to adequately restrain the pressure bladder from extending outward so that the anti-G suit accomplishes its function as an anti-G suit.

Modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

We claim:

1. An anti-G suit for wear by an aircrew member, comprising:

(a) a continuous pressure bladder having an abdominal bladder section shaped to cover a front abdominal region of the aircrew member and a pair of leg bladder sections, each leg bladder section having edges, individually shaped so that they can each completely wrap around one leg of the aircrew member and slightly overlap where edges of each leg section meet; and, (b) an outer covering having generally the shape of a pair of trousers for covering the pressure bladder, wherein the outer covering is made of a nonextensible material so that, upon inflation of the pressure bladder, the outer covering restrains the pressure bladder from extending outward.

2. The anti-G suit of claim 1, further comprising a pair of sock bladders completely covering the feet and ankles of the aircrew member, wherein the sock bladders are pneumatically interconnected with the pressure bladder.

3. The anti-G suit according to claim 1, further comprising at least one noncollapsible channel from the abdominal bladder section of the pressure bladder to a leg bladder section.

4. The anti-G suit according to claim 1, further comprising at least one noncollapsible channel across the inside of the abdominal bladder section of the pressure bladder.

* * * * *